(No Model.)
W. WINDER.
ELECTRIC TRAIN SIGNAL.
No. 413,879. Patented Oct. 29, 1889.
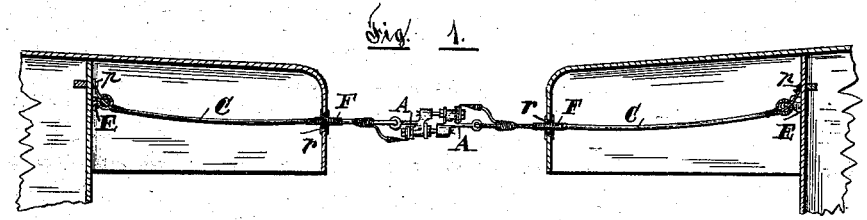
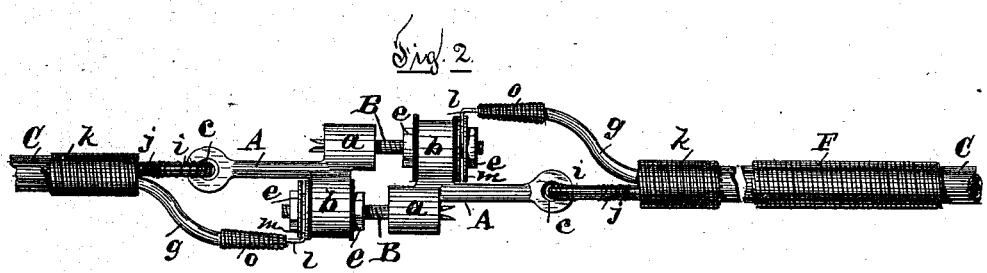
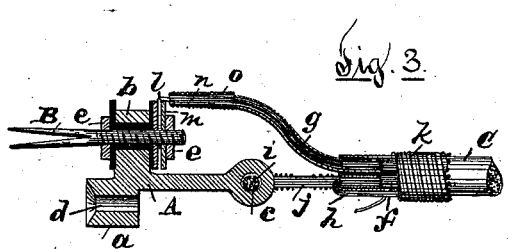
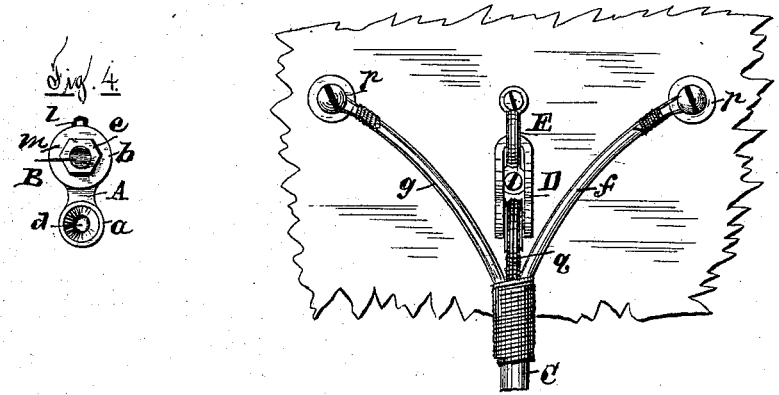
Witnesses:
Walter S. Bowen,
L. S. Burbank.
Inventor:
William Winder.
By his Attorney
Edw. Sumner

UNITED STATES PATENT OFFICE.

WILLIAM WINDER, OF PORTSMOUTH, NEW HAMPSHIRE.

ELECTRIC TRAIN-SIGNAL.

SPECIFICATION forming part of Letters Patent No. 413,879, dated October 29, 1889.

Application filed August 8, 1889. Serial No. 320,163. (No model.)

*To all whom it may concern:*

Be it known that I, WILLIAM WINDER, a citizen of the United States, residing at Portsmouth, in the county of Rockingham and State of New Hampshire, have invented certain new and useful Improvements in Electric Train-Signals, of which the following is a specification, reference being had to the accompanying drawings.
My invention relates particularly to the couplings for electric train-signals, but also to the connections of electric cords with the couplings and the cars.

The object of my invention is to so construct the couplings and connections as to insure more perfect electrical contacts and insulation and greater durability than heretofore, the invention consisting in the devices and combinations of devices hereinafter described, and specifically pointed out in the claims.

In the drawings, Figure 1, drawn on a smaller scale than the other figures, illustrates a coupling, together with the cords and connections, as applied to cars, and embodying my invention. Fig. 2 shows the coupling and parts of the cords and connections. Fig. 3 shows a section of one member of the coupling, also a section of part of the cords and connections. Fig. 4 is an end view of one member of the coupling. Fig. 5 illustrates the manner of fastening the electric cords to a car.

The coupling consists of two members which are alike one to the other. The electric cords and their connections for one member of the coupling are also similar to those for the other member. Each member of the coupling consists, mainly, of a metallic piece A, which has two branches $a$ and $b$, and is provided with an eye $c$. The branch $a$ has a longitudinal opening $d$, preferably tapered at the outer end, as shown. The other branch $b$ has an opening, in which is secured, as by means of two nuts $e$, a rod or pin B, which extends some distance from the outer end of the branch, as shown. This pin is split through the greater part of the extended portion thereof. Each part thus formed is of the nature of a spring, whereby the normal position of these parts is such that they are sprung somewhat at a distance from each other, as illustrated in Fig. 3. The pin B is insulated from the metallic piece A of the member of the coupling, as illustrated.

I employ a flexible cable C, which consists of two flexible insulated electric cords $f$ and $g$. One $f$ of these cords has a metallic connection with the piece A, while the other $g$ has a metallic connection with the pin B. I connect the cord $f$ with the piece A by removing the insulating material of the cord from a portion near the end thereof, bending the wires $h$ thus uncovered back upon the body of the cable, and then, having formed a loop $i$ of wires $j$, carry these wires back parallel with the wires $h$ of the cord and wind a wire $k$ around the cable-wires $h$ and $j$. Thus is made not only a good metallic connection between the cord $f$ and loop $i$, but also a strong union, so that they may not be easily pulled apart. The loop $i$ being formed in the eye $c$, a good electric contact and strong mechanical connection is made of the loop with the piece A. A wire $l$ is bent around the pin B and held firmly in metallic contact therewith by means of washers $m$ and the nuts $e$. The wire $l$ is carried back to lap onto the cord $g$. The wires $n$ of this cord are exposed and bent back, and a wire $o$ wound around the cord $g$, wire $l$, and wires $n$, thus making a connection like that of the loop $i$ with the cord $f$. At the other end of the cable C the cords $f$ and $g$ thereof are separated, so that each one will have a metallic connection with a plate or stud $p$ by being fastened thereto. These plates or studs will have the ordinary electric connections with the usual wires completing the signaling-circuit. In order that there will be no strain upon these cords at their places $p$ of electrical connection, I secure to the cable a loop $q$, which is joined, preferably by means of a link D, to a bracket E, fastened to the car. Thus the cable is held firmly to the car against any pull thereon, and has also a very pliable connection therewith. The outer coverings of electric cords have heretofore worn out rapidly where they pass through the opening $r$ in the hood of the car. To prevent this wear, I cover the cord or cable at the required part with a metallic covering F. This covering is preferably made by winding a wire of the required substance around the cord or cable, as illustrated.

The two members of the coupling, formed as described, may be readily joined by thrusting the split pin B of each member into the opening d of the other member. Thus good electrical connections between the two members and the cords will be secured. The whole device will bear without injury or separation the strains and motions incident to their working position. When the cars are uncoupled and move apart, the members of the electric coupling will separate, as required.

I claim as my invention—

1. The combination, for each of two like members of a coupling for an electric train-signal, of a metallic piece A, provided with a branch a to receive the split pin of the other member, and a branch b, having an insulated split pin B secured therein, two flexible electric cords which are insulated from each other, but which united in one cable are linked to a bracket E, adapted to be fastened to a car, one of said cords being electrically connected with said piece A and with one of two plates or studs p, adapted to be fastened to the car, and the other of said cords being electrically connected with the split pin and with the other of said plates or studs, substantially as and for the purposes set forth.

2. In combination with a car having a hood, a flexible electric cable composed of two cords insulated from each other, a metallic piece A, to form one member of an electric coupling, provided with a branch a, having an opening to receive a split pin attached to the other member of the coupling, and provided with a branch b, in which is secured an insulated split pin B, the cable being protected by a metallic covering F where it passes through an opening in the hood, and linked to a bracket E, fastened to the car, the cords of the cable being separated at each end, one of the cords being electrically connected with the split pin and with one of two insulated plates or studs p fastened to the car, and the other of said cords being electrically connected with the piece A and with the other of said plates or studs, substantially as and for the purposes set forth.

WILLIAM WINDER.

Witnesses:
FRANK R. STARKEY,
JAMES R. BEANS.